United States Patent [19]
Droulon et al.

[11] Patent Number: 5,641,145
[45] Date of Patent: Jun. 24, 1997

[54] VEHICLE SEAT SLIDE AND A VEHICLE SEAT FITTED WITH SUCH A SLIDE

[75] Inventors: Georges Henri Droulon, St Georges des Groseillers; Pierre Gabriel Raymond Moradell, St Gregoire du Vievre, both of France

[73] Assignee: Bertrand Faure France, France

[21] Appl. No.: 498,723

[22] Filed: Jul. 5, 1995

[30] Foreign Application Priority Data

Jul. 8, 1994 [FR] France .................................. 94 08490

[51] Int. Cl.$^6$ .................................................. F16M 13/00
[52] U.S. Cl. .......................................... 248/429; 248/424
[58] Field of Search ................................. 248/429, 424

[56] References Cited

U.S. PATENT DOCUMENTS 1,684,944  9/1928  Chapman .

5,273,241  12/1993  Droulon .

FOREIGN PATENT DOCUMENTS 0537057  4/1993  European Pat. Off. .
2430330  2/1980  France .
0261460  11/1926  United Kingdom .

*Primary Examiner*—Peter M. Cuomo
*Assistant Examiner*—Stephen Vu
*Attorney, Agent, or Firm*—Larson and Taylor

[57] ABSTRACT

A memory slide for a vehicle seat, the slide comprising a fixed rail, a moving rail, a first lock to lock the moving rail, a memory shoe that is displaceable along the fixed rail and that defines a memorized position for the moving rail, a second lock for locking the memory shoe, coupling members for securing the moving rail to the memory shoe, a first control member for unlocking the first and second locks simultaneously, and a second control member for unlocking the first lock only. The memory shoe including a fixing member for fixing a safety belt.

9 Claims, 3 Drawing Sheets

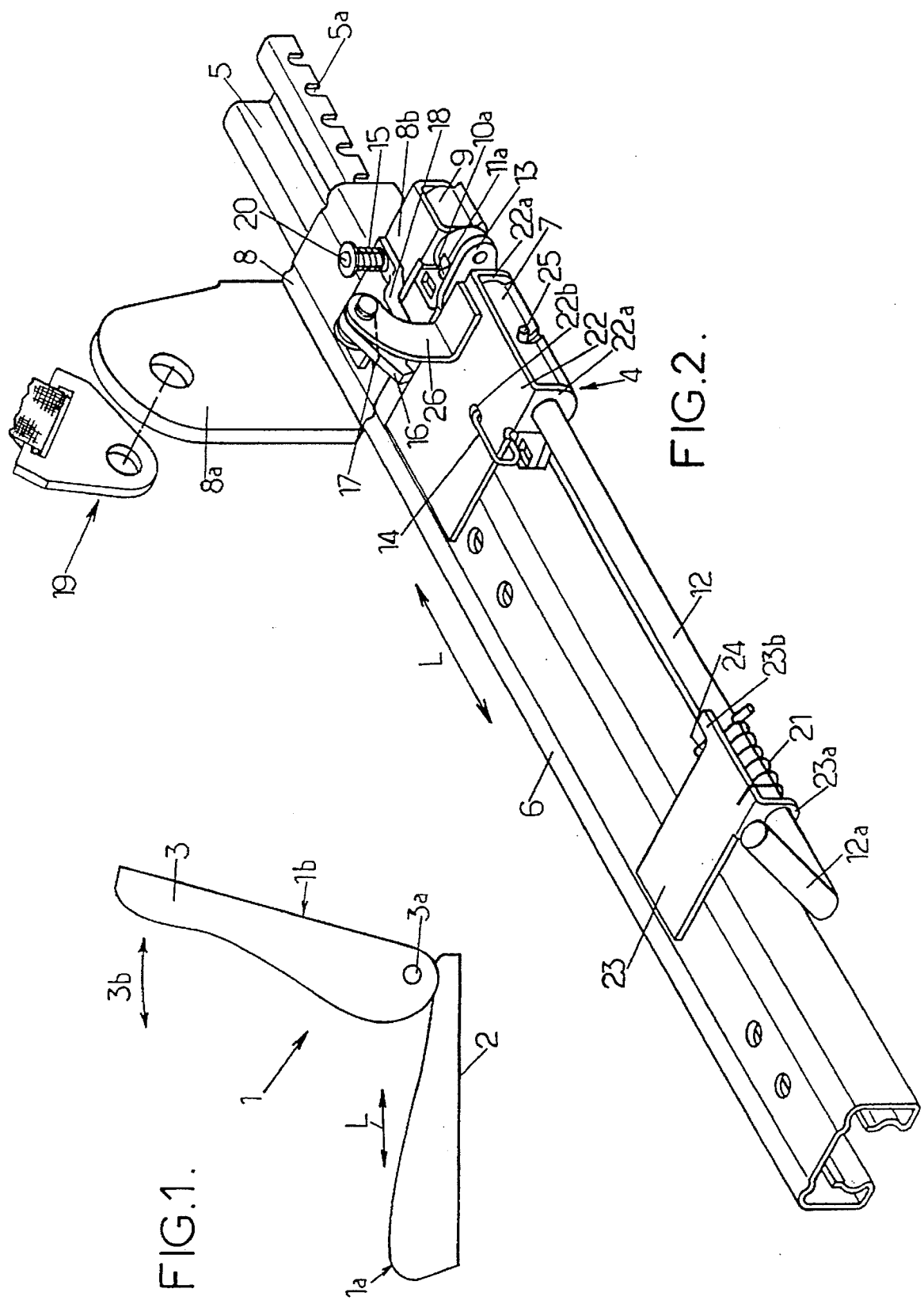

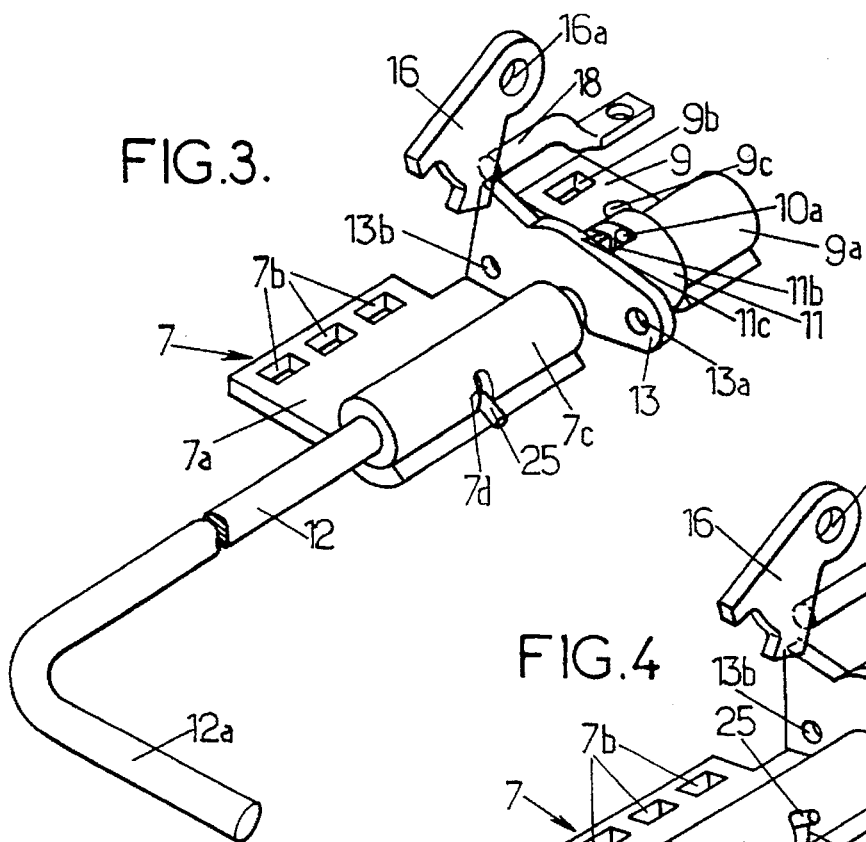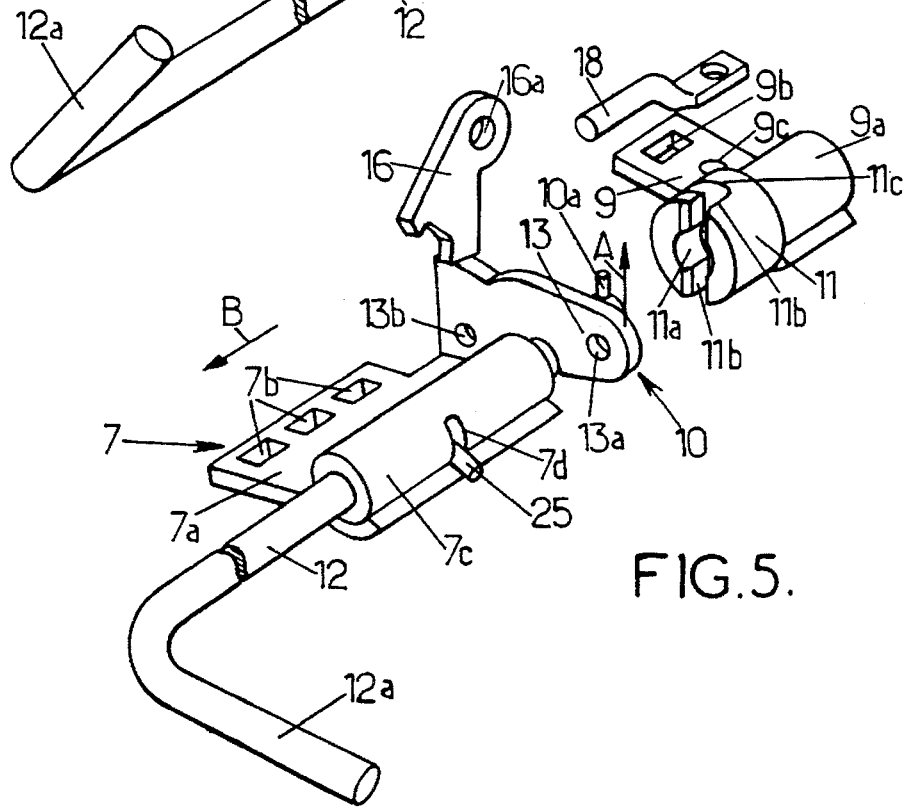

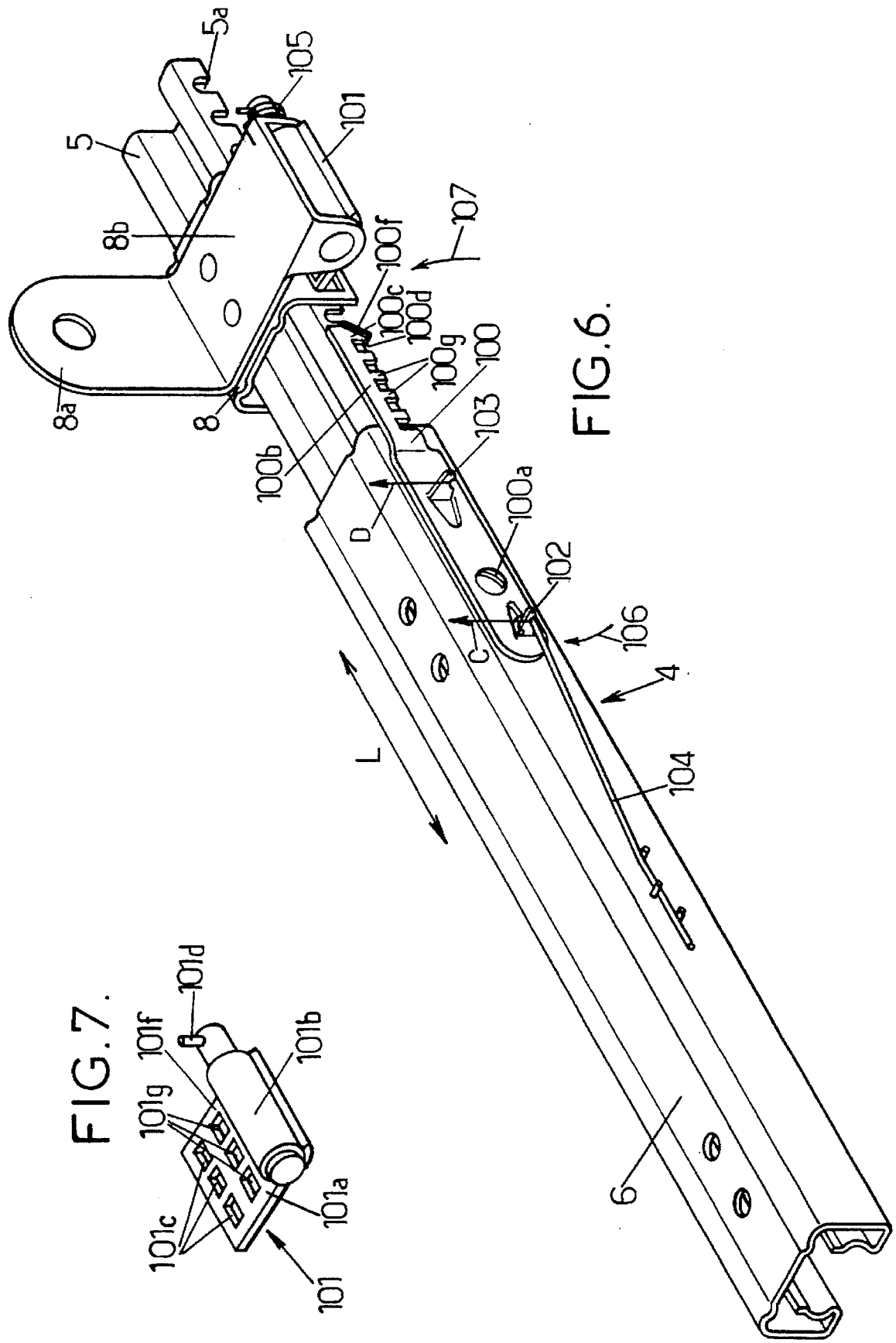

VEHICLE SEAT SLIDE AND A VEHICLE SEAT FITTED WITH SUCH A SLIDE

FIELD OF THE INVENTION

The present invention relates to slides for vehicle seats, and to vehicle seats fitted with such slides.

More particularly, the invention is intended for vehicle seats that comprise a seat proper which is generally mounted on two slides for the purpose of enabling the seat to be moved backwards and forwards in translation along a "longitudinal" direction, and in which the seat proper must be capable of being moved forwards quickly and then being moved back again easily into its previously-adjusted position.

The invention relates in particular to the front seats of two-door motor vehicles, where the seats need to be moved forwards while their backs are simultaneously folded down so as to release access to the back seats.

BACKGROUND OF THE INVENTION

Document U.S. Pat. No. 1,684,944 discloses a memory slide for a vehicle seat that comprises:

a "fixed" first rail deigned to be secured to the vehicle;

a "moving" second rail designed to support the seat proper, said moving rail being disposed parallel to the fixed rail and being mounted to slide along said fixed rail;

first locking means for locking the moving rail relative to the fixed rail, said first locking means being capable of being placed either in a locked state in which the moving rail is locked relative to the fixed rail, or else in an unlocked state in which the moving rail is free to slide along the fixed rail;

a memory shoe displaceable in translation along the fixed rail and limiting movement of the moving rail in the longitudinal direction of the fixed rail, thereby defining a memorized position of the moving rail, the memory shoe including a length of rail having the same section as the moving rail, which length is slidably mounted to slide along the fixed rail in the same manner as said moving rail;

second locking means for locking the memory shoe relative to the fixed rail, said second locking means being capable of being placed either in a locked state in which the memory shoe is locked relative to the fixed rail, or else in an unlocked state in which the memory shoe is free to slide along the fixed rail;

coupling means for coupling the moving rail to the memory shoe, said coupling means being in a coupled state at least when the first and second locking means are both in the unlocked state, the moving rail and the memory shoe then being secured to each other, and said coupling means being in an uncoupled state at least when the first locking means are in the unlocked state while the second locking means are in the locked state, the moving rail and the memory shoe then being no longer secured to each other;

first control means for placing the first and second locking means simultaneously in the unlocked state; and second control means for placing the first locking means only in the unlocked state, the second locking means then remaining in the locked state.

The seat disclosed in the above-mentioned document does not include a safety belt.

However, vehicle seats are known from elsewhere that do include safety belts in which at least one of the three fixing points of the belt is connected to the seat.

As a general rule, this fixing point is connected to the structure of the seat proper, such that when the vehicle is subjected to a shock giving rise to a large force on the belt fixing points, in particular in the event of an accident, this force may possibly give rise to the fixed rail and the moving rail that support the seat being deformed.

There is then a risk that the seat will no longer be capable of sliding forwards and this can have very severe consequences if the seat in question is a front seat of a two-door vehicle: under such circumstances, firstly the back seat passengers run the risk of being greatly impeded in any attempt to get out of the vehicle quickly after an accident, and secondly, emergency services can likewise be impeded in gaining access to the back seats if the back seat passengers are injured.

OBJECTS AND SUMMARY OF THE INVENTION

A particular object of the present invention is to provide a seat slide of the type defined above which enables the above drawbacks to be remedied.

According to the invention, a memory slide for a vehicle seat of the kind in question has a memory shoe which further includes a fixing member for a safety belt.

Thus, even after the vehicle has been subjected to a large shock, if the traction force applied to the safety belt causes the memory shoe or the corresponding portion of the fixed rail to be deformed, the moving rail of the slide nevertheless remains undeformed and the fixed rail is generally likewise undeformed where it engages the moving rail. Consequently, the seat can still be moved forwards so as to allow the back seat passengers to get out of the vehicle.

In preferred embodiments, use is made of one or more of the following dispositions:

the fixed rail includes a set of teeth; the first locking means include a first lock which is mounted on the moving rail and which co-operates with the set of teeth to lock the moving rail; and the second locking means include a second lock which is mounted on the memory shoe and which co-operates with set of teeth to lock the memory shoe: thereby taking advantage of the set of teeth provided on the fixed rail to lock the moving rail for the purpose of also locking the memory shoe;

the first locking means include a first lock mounted on the moving rail and co-operating with the fixed rail to lock said moving rail, said first lock being displaceable between a locked position and an unlocked position which corresponds respectively to the locked state and the unlocked state of the first locking means, and said first lock is biased towards the locked position by a first spring; the second locking means include a second lock which is mounted on the memory shoe and which co-operates with the fixed rail to lock said memory shoe, said second lock being displaceable between a locked position and an unlocked position corresponding respectively to a locked state and to an unlocked state of the second locking means, and said second lock is biased by a second spring towards the locked position; a pawl is mounted on the moving rail, said pawl being displaceable between an engaged position in which it holds the first lock in the unlocked position, and a retracted position in which it does not interfere with the first lock, said pawl being biased towards its engaged position by a third spring; and an abutment member secured to the memory shoe, said abutment member being designed to displace and hold the pawl in its retracted position while the moving rail is in its memorized position: the pawl thus making it possible to keep the first lock in the unlocked position as soon as the first control means have been actuated and the seat proper of the seat has been advanced a little, with this continuing to be the case until the seat proper of the seat has returned to its memorized position;

the first control means include a control shaft which extends longitudinally parallel to the fixed rail and to the moving rail, and which is mounted to rotate between a rest position and an actuation position, the control shaft being urged towards its rest position by a fourth spring; the first lock is mounted to rotate with lost motion about the control shaft, first and second angular clearances being provided in two respective opposite angular directions between the control shaft and the first lock when the control shaft is in its rest position and the first lock is in the locked position, the first angular clearance allowing the first lock to move from the locked position to the unlocked position under the action of second control means without entraining rotation of the control shaft, the second angular clearance being provided so that rotation of the control shaft from its rest position to its actuation position takes place initially without rotating the first lock until said second angular clearance has been taken up, after which the control shaft entrains the first lock to the unlocked position; the second lock is mounted to rotate about an axis disposed in line with the control shaft; and the control shaft includes a coupling end that comes into engagement with a receiver portion secured to the second lock when the moving rail is in its memorized position, the control shaft then entraining the second lock in rotation from the locked position to the unlocked position with third angular clearance when said control shaft is displaced from its rest position to its actuation position, a bayonet coupling being provided between the actuation end of the control shaft and the receiver portion to secure the moving rail to the memory shoe after taking up the third clearance, said coupling end and said receiver end thus constituting the abovementioned coupling means;

the second control means include a crank secured to the second lock;

the first locking means include a first lock which is mounted on the moving rail and which is biased into a rest position by a first spring; the second locking means are constituted by a second lock which is mounted on the memory shoe and which is displaceable between a locked position in which it co-operates with the fixed rail to lock the memory shoe, and an unlocked position in which it enables the memory shoe to slide, said second lock being biased towards the locked position by a second spring; the first lock engages the second lock when said first lock is in its rest position and said second lock is in the locked position so long as the moving rail is in its memorized position, for the purpose of locking the moving rail to the memory shoe which is itself locked relative to the fixed rail, the first and second locking means thus being in the locked state; the first lock is displaceable in a first direction under the action of first control means, the first lock then remaining engaged with the second lock and acting on said second lock to displace it into the unlocked position, the first and second locking means then being in the unlocked state and the first lock constituting the coupling means between the moving rail and the memory shoe; and the first lock is also displaceable in a second direction opposite to the first direction under action from the second control means, thereby releasing the first lock, the first locking means thus being in the unlocked state while the second locking means remain in the locked state: in this embodiment, the number of parts constituting the memory slide is particularly small; and the first and second locks include respective portions which co-operate by cam action to displace the first lock in the second above-mentioned direction when the moving rail is returned towards its memorized position after having been moved away therefrom, the first lock subsequently be returned to its rest position once the moving rail has returned to its memorized position, thereby locking the moving rail, the second spring having sufficient force to hold the second lock in the locked position during this movement.

The invention also provides a vehicle seat including a seat proper mounted to slide longitudinally by means of a slide as defined above, the seat proper being fixed to the moving rail of the slide, said seat including a safety belt having a plurality of fixing points, one of which is constituted by the fixing member belonging to the memory shoe.

Advantageously, the fixing member belonging to the memory shoe is the only fixing point of the belt which is fixed to the seat.

BRIEF DESCRIPTION OF THE DRAWINGS

Other characteristics and advantages of the invention appear from the following detailed description of two embodiments given as non-limiting examples, and described with reference to the accompanying drawings.

In the drawings:

FIG. 1 is a diagrammatic view showing a seat suitable for being fitted with at least one memory slide of the invention;

FIG. 2 is a perspective view showing a memory slide constituting a first embodiment of the invention;

FIG. 3 is a detail view showing the positions of various essential members of the FIG. 2 slide in its normal, in-use position;

FIG. 4 is a view similar to FIG. 3 during adjustment of the longitudinal position of the seat;

FIG. 5 is a view similar to FIGS. 3 and 4, in the position where the moving rail has been moved forwards, without displacing the memory shoe, in order to gain access to the back seat(s);

FIG. 6 is a perspective view of another embodiment of a slide of the invention; and FIG. 7 is a view showing a detail of FIG. 6.

In the various figures, the same references designate elements that are identical or similar.

MORE DETAILED DESCRIPTION

As shown diagrammatically in FIG. 1, the invention applies to a vehicle seat 1, in particular a front seat of a two-door motor vehicle, i.e. a vehicle in which it is necessary to move at least one of the front seats in order to gain access to a back seat.

The seat 1 comprises a seat proper 2 which defines a front portion 1a of the seat, and a back 3 which defines a rear portion 1b of the seat. The seat proper 2 is displaceable in translation both forwards and backwards relative to the floor of the vehicle in a longitudinal direction L.

The seat also includes a back 3 which is mounted on the seat proper 2 in such a manner as to pivot about an axis 3a between a folded-down position and an upright position constituting the normal, in-use position of the seat, and as represented in FIG. 1 by double-headed arrow 3b.

To gain access to the back seat(s) of the vehicle, the seat proper 2 is moved forwards as far as possible in the longitudinal direction L, and the back 3 is folded down, likewise in a forwards direction.

The seat proper 2 is generally mounted on the floor of the vehicle via two slides extending in the direction L, at least one of the two slides being capable of being a memory slide 4 that makes it possible to return the seat automatically to the position it previously occupied prior to being moved forwards to give access to the back seats of the vehicle.

In all cases, such a memory slide comprises a "fixed" first rail 5 which is fixed to the floor of the vehicle, and a "moving" second rail 6 which supports the seat proper 2 and which extends parallel to the fixed rail, being capable of sliding along said fixed rail in the longitudinal direction L.

The moving rail 6 can be locked relative to the fixed rail 5 by a first lock 7, or 100, which locks are described below when describing different embodiments.

The memory slide includes a memory shoe 8 comprising a length that is shaped to have the same section as the moving rail 6, said shaped length being slidably mounted on the fixed rail 5 in the same manner as the moving rail 6.

The memory shoe 8 includes a fixing tab 8a for attachment to an attachment point 19 of a safety belt.

Preferably, of the three attachment points of a safety belt, the top and bottom attachment points situated on the same side of the seat are fixed to the body of the vehicle while the third attachment point, i.e. the point that is disposed near the middle of the vehicle and which includes the buckle of the safety belt is fixed to the fixing tab 8a.

The memory shoe 8 includes a "second" lock 9, or 101, which co-operates with the fixed rail 5 to lock the memory shoe relative to the fixed rail, and which is displaceable between a locked position in which the memory shoe is locked relative to the fixed rail, and an unlocked position in which the memory shoe is free to slide along the fixed rail.

In the examples shown in the drawings, the fixed rail 5 includes a downwardly directed longitudinal rim on one side having a set of teeth 5a, and the second lock, 9 or 101, includes a plate which is pivotally mounted on a support 8b secured to the memory shoe 8 about an axis 9a (or 101b) parallel to the direction L.

The plate of the second lock 9, 101 has a plurality of orifices 9b, 101c suitable for engaging with the set of teeth 5a, and it penetrates into a recess formed in one side of the memory shoe 8 in such a manner as to bring the orifices 9b, 101c beneath the set of teeth 5a.

The second lock is rotatably biased towards the locked position by a respective spring 15 or 105. In FIGS. 2 to 5, the spring is a helical compression spring 5 mounted between the support 8b and an enlarged head situated at one end of a rod 20 passing through the support 8b and having its other end passing through a slot 9c formed in the plate of the second lock 9, said other end also including an enlarged head disposed beneath the lock 9. In FIGS. 6 and 7, the spring 105 is a torsion spring mounted between the support 8b and a peg 101d at one end of the axis 101b of the second lock 101.

In a first embodiment, as shown in FIGS. 2 to 5, the first lock 7 co-operates with the set of teeth 5a on the fixed rail.

The first lock 7 is rotatably mounted on one side of the moving rail 6 about an axis that extends parallel to the direction L so as to move between a locked position in which the first lock 7 co-operates with the set of teeth 5a to lock the moving rail 6 relative to the fixed rail, and an unlocked position in which the moving rail 6 is free to slide relative to the fixed rail.

The first lock 7 includes a plate 7a that is substantially plane and that presents a row of orifices 7b suitable for coming into engagement with the set of teeth 5a, the plate 7a penetrates into the moving rail 6 via a recess formed on one side of said moving rail, in such a manner as to bring the orifices 7b beneath the set of teeth 5a.

The plate 7a of the first lock is secured to a crank 13 itself constituted by a substantially plane plate extending perpendicularly to the plate 7a, the crank enabling the second lock 7 to be moved towards the unlocked position.

By way of example, the crank 13 may be actuated by means of a cable (not shown) having one end fixed to said crank via a hole 13a formed in the crank.

Finally, the plate 7a is also secured to a cylindrical socket 7c which extends axially parallel to the direction L and which is rotatably mounted with lost motion about a control shaft 12 which passes through it.

The control shaft 12 extends parallel to the direction L between a first end 10 referred to as a "coupling" end, and a second end provided with a controlling crank handle 12a or with any other means enabling the control shaft 12 to rotate about its axis.

The control shaft 12 rotates in two end plates 22a on a support 22 which is fixed to the moving rail 6, the two end plates 22a being disposed on either side of the socket 7c.

The control shaft 12 also rotates in an end plate 23a on another support 23 likewise fixed to the moving rail 6.

A torsion spring 21 mounted between the support 23 and a peg 24 on the control shaft 12 urges said control shaft 12 towards a rest position which is defined by the peg 24 coming into abutment against a portion 23b of the support 23. From this rest position, the control shaft 12 may be rotated to an actuating position in which it drives the first and second locks 7 and 9 into the unlocked positions, as described below.

The first lock 7 is urged in rotation about the control shaft 12 towards a locked position by a substantially U-shaped bending spring 14 having one branch extending over the support 22 and penetrating into an orifice 22b of the support and having its other branch penetrating into an orifice 13b of the plate constituting the crank 13.

The control shaft 12 rotates the first lock 7 by means of a peg 25 secured to said control shaft and passing through a circumferentially-extending slot 7d formed in the cylindrical socket 7c of the first lock.

When the control shaft 12 is in its rest position and the first lock 7 is in the locked position, as shown in FIGS. 2 and 3, then the slot 7d leaves angular clearance in both opposite directions of rotation between the control shaft and the first lock:

first angular clearance allows the first lock to move from the locked position to the unlocked position without causing the control shaft 12 to rotate; and second angular clearance is provided so that rotation of the control shaft 12 from its rest position to its actuation position takes place initially without rotating the first lock 7 until said second clearance has been taken up, after which the control shaft 12 causes the first lock to rotate into the unlocked position.

The support 22 also carries a tab 26 having a pawl 16 rotatably mounted thereon to rotate about an axis 16a, the pawl 16 being displaceable between an engagement position in which it comes into abutment against a portion of the plate constituting the crank 13, thereby locking the first lock 7 in the unlocked position, and a retracted position in which it does not interfere with the first lock.

The pawl 16 is urged towards its engagement position by a torsion spring 17 mounted between said pawl and the tab 26.

The pawl 16 also co-operates with an abutment finger 18 secured to the memory shoe 8, said abutment finger being designed to displace and hold the pawl 16 in its retracted position when the moving rail 6 is in its memorized position.

In addition, the axis 9a of the second lock 9 is located in line with the control shaft 12, and this axis is secured to a receiver socket 11 which co-operates with the coupling end 10 of the control shaft 12 for the purposes both of causing the second lock 9 to rotate and of securing the memory shoe to the moving rail 6.

The receiver socket 11 includes a cylindrical central recess 11a designed to receive the coupling end 10 of the shaft 12. This central recess 11a communicates with two diametrically opposite slots 11b which extend axially and radially and pass through the wall of the socket 11, said slots 11b themselves communicating at their ends close to the axis 9a respectively with two slots 11c which extend radially and circumferentially and likewise pass through the wall of the socket 11. Each of the slots 11c extends over an angle that is close to the above-mentioned second angular clearance.

The slots 11b and 11c are designed to receive a peg 10a secured to the control shaft 12 extending perpendicularly to the shaft 12 and forming two radially opposite lugs, said lugs being located to correspond with the slots 11b when the control shaft 12 is in its rest position.

The device of FIGS. 2 to 5 operates as follows.

So long as the moving rail 6 is in its memorized position, the control shaft 12 is in its rest position and the first lock 7 is in the locked position as shown in FIGS. 2 and 3, this constituting the normal configuration of the slide while the seat is in use, the moving rail and the memory shoe 8 being locked relative to the fixed rail 5 by the first and second locks 7 and 9, the pawl 16 being held in its retracted position by the abutment finger 18, and the peg 10a being engaged in the bottoms of the two slots 11b of the receiver socket 11.

When the user seeks to adjust the longitudinal position of the seat proper 2, it is necessary to rotate the crank 12a of the control shaft 12 in such a manner as to cause the control shaft 12 to rotate into its actuation position, as shown in FIG. 4. During this movement, the control shaft 12 initially pivots without driving the locks 7 and 9, while the peg 25 moves in the slot 7d to take up the above-mentioned second clearance and the peg 10a moves in the slots 11b of the receiver socket 11, thereby providing a bayonet coupling between the receiver socket 11 and the coupling end of the control crank which secures the memory shoe 8 to the moving rail 6.

After this initial stage of the control shaft 12 moving in rotation, said control shaft drives the two locks 7 and 9 in rotation until they reach the unlocked positions, after which it is possible to adjust the longitudinal position of the seat by causing the moving rail 6 to slide together with the memory shoe 8 simultaneously along the fixed rail 5. During this movement, the pawl 16 is held in its retracted position by the abutment finger 18.

When adjustment of the longitudinal position of the seat has been completed, the user releases the lever 12a so that the control shaft is returned to its rest position by the spring 21, and the first and second locks 7 and 9 are returned to their rest positions by the springs 14 and 15, respectively.

Starting from the position as adjusted by the user, when it is necessary to advance the seat as far as possible in order to provide access to the back seats of the vehicle, the user acts on the crank 13 via a cable that generally runs along the back of the seat and that is connected to a control lever generally enabling the user simultaneously to fold the back down forwards onto the seat proper, and to exert forward thrust on the seat.

During this movement, the crank 13 is subjected to a force A causing the first lock 7 to pivot to its unlocked position, but without causing the control shaft 12 to be influenced by this movement, given the first angular clearance provided between the control shaft 12 and the first lock 7.

Simultaneously, a force B is exerted on the moving rail 6 in the longitudinal direction L and in the forwards direction, so that the moving rail 6 slides forwards together with the seat. The peg 10a at the coupling end of the control lever 12 does not interfere with this movement since the control lever 12 is still in its rest position, such that said peg 10a is disposed in a position that corresponds with the axial slots 11b of the receiver socket 11 that is secured to the second lock 9.

As soon as the moving rail 6 has moved a little in the forwards direction, the pawl 16 is no longer supported by the abutment finger 18, and as a result said pawl is displaced into its engagement position by the spring 17. Consequently, even if the user releases the crank 13 very quickly after engaging it, the first lock 7 is kept in the unlocked position by the pawl 16.

The user is thus free to move the seat proper 2 a maximum distance in the forwards direction, while the memory shoe 8 remains in its initial position since the second lock 9 is still in the locked position.

When the user seeks to return the seat to its previously-adjusted position, it suffices to push the seat proper 2 backwards as far as it will go until the moving rail 6 comes into abutment against the memory shoe 8, i.e. until the moving rail 6 returns to its memorized position.

At this moment, the coupling end 10 of the control shaft 12 penetrates again into the recess 11a of the receiver socket 11, while the peg 10a at said coupling end penetrates into the slots 11b of the receiver socket.

Simultaneously, the abutment finger 18 secured to the memory shoe 8 moves the pawl 16 into its retracted position so that the first lock 7 is returned to the locked position by the spring 14.

The device is thus back in its configuration as shown in FIGS. 2 and 3.

In the second embodiment of the invention, shown in FIGS. 6 and 7, the first lock 100 does not co-operate with the set of teeth 5a on the fixed rail, but instead it co-operates with the second lock 101 which in turn cooperates with the set of teeth 5a of the fixed rail.

The first lock 100 is rotatably mounted to one side of the moving rail 6 about an axis 100a perpendicular to the direction L and parallel to the plate 101a of the second lock when the second lock is in the locked position.

The first lock is urged towards a rest position in which it extends longitudinally substantially parallel to the direction L, by means of a bending spring 104 having one end fixed to the side of the moving rail 6 and having its other end fixed to a lug 102 on the first lock.

Starting from this rest position, the first lock can be displaced in rotation in a first direction 106, and in a second direction 107 that is opposite to the first direction.

The first lock 100 includes an arm 100b which extends substantially parallel to the direction L towards the memory shoe 8, and which, when the moving rail 6 is in its memorized position, penetrates into a space 108 that is left empty above the plate 101a of the second lock and below the support 8b on which the second lock is mounted.

The arm 100b has a distal end forming a downwardly extending projecting portion 100c, said projecting portion having a stop edge 100d extending perpendicularly to the longitudinal direction of said wall 100b on the side of the projecting portion closest to the axis 100a, and on its side remote from the axis 100a, it has a sloping edge 100f.

The first lock 100 also includes teeth 100g which extend downwards from the arm 100b, without going beyond the projecting portion 100c, said teeth being capable of engaging in corresponding holes 101g of the plate 101a of the second lock.

The projecting portion 100c is nevertheless wider than the orifices 101g, so that said projecting portion cannot penetrate into said orifices by passing over the plate 101a of the second lock.

Optionally, the teeth 100g and the orifices 101g could be omitted, without going beyond the ambit of the present invention, coupling between the first lock 100 and the second lock 101 then taking place solely via the projecting portion 100c.

The second embodiment of the device operates as follows.

While the seat supported by the slide is in its normal, in-use position, then the moving rail 6 is in its memory position, the second lock 101 is in the locked position and the first lock 100 is in its rest position, the stop edge 101d of the projecting portion 100c being engaged against a corresponding edge 101f of the plate 101a of the second lock, and the teeth 101g of the first lock being engaged in the corresponding holes 101g of the plate 101a of the second lock.

When the user of the seat seeks to adjust the longitudinal position of the seat, it suffices merely to pivot the first lock 100 in the first direction 106. For this purpose, the abovementioned lug 102, which is disposed opposite the rod 100b relative to the axis 100a, may optionally be fixed to a cable which is itself under the control of a lever that is accessible to the user (not shown), the action of the user giving rise to a force C being applied to the lug 102 in an upwards direction.

The pivoting of the first lock 100 in the first direction 106 causes the second lock 101 to pivot into the unlocked position by the arm 100b pressing against the plate 101a of the second lock.

Thus, the moving rail 6 can be displaced freely along the fixed rail 5, and the memory shoe 8 remains coupled to the moving rail 6 because the stop edge 100d of the first lock is engaged against the corresponding edge 101f of the second lock due to one end of the moving rail 6 being in abutment against one end of the memory shoe 8, and also, where appropriate, due to engagement between the teeth 100g of the first lock in the holes 101g of the second lock.

Once the longitudinal position of the seat has been adjusted, should it be necessary to move the seat forwards as far as possible to give access to the back seats of the vehicle, the user causes the first lock 100 to pivot in the second direction, thereby releasing the stop edge 100d from the corresponding edge 101f, and the teeth 100g from the orifices 101g.

Simultaneously, the user pushes the seat forwards so that after it has moved a very short distance forwards, corresponding to an identical forwards movement of the moving rail 6 that supports the seat proper, the arm 100b of the first lock is no longer inside the space 108 above the plate 101a of the second lock, so that the user can release the first lock.

The pivoting movement of the first lock 100 may be obtained, for example, by applying a force D in an upwards direction on a lug 103 of the first lock, which lug is disposed between the axis 100a and the rod 100b, with application of this force being optionally obtained, for example, by means of a cable which generally runs along the back of the seat and which is connected to a control lever (not shown).

Thus, the user can advance both the seat 2 and also the moving rail 6 as far forwards as possible while leaving the memory shoe 8 in place since the second lock 101 remains in the locked position.

When the user seeks to return the seat into its memorized position, it suffices to push the seat backwards in the direction L until the moving rail 6 has returned towards the memory shoe 8 all the way to the memorized position in which it comes into abutment against said shoe.

During this movement, the chamfered edge 100f of the arm 100b of the first lock co-operates with the plate 101a of the second lock to cause the first lock to pivot in the second direction by the cam effect, thereby causing the arm 100b of the first lock to pass over the plate 101a.

This pivoting of the first lock 100 does not cause the second lock 101 to pivot into the unlocked position because the spring 105 urges the second lock into the locked position with sufficient force.

Because the projecting portion 100c is wider than the orifices 101g, the first lock 100 locks onto the plate 101a of the second lock only once the projecting portion 100c has gone beyond the plate 101a.

Thus, the slide is returned to its normal, in-use position.

What is claimed is:

1. A memory slide for a vehicle seat, the slide comprising:

a fixed rail adapted to be secured to the vehicle;

a moving rail adapted to support a seat proper of the seat, said moving rail being disposed parallel to the fixed rail and being mounted to slide along said fixed rail;

first locking means for locking the moving rail relative to the fixed rail, said first locking means being capable of being placed either in a locked state in which the moving rail is locked relative to the fixed rail, or in an unlocked state in which the moving rail is free to slide forward and backward along the fixed rail;

a memory shoe displaceable in translation along the fixed rail and limiting movement of the moving rail packward in the longitudinal direction of the fixed rail, thereby defining a memorized position of the moving rail, the memory shoe including a length of rail having the same section as the moving rail, wherein said length is slidably mounted to slide along the fixed rail in the same manner as said moving rail;

second locking means for locking the memory shoe relative to the fixed rail, said second locking means being capable of being placed either in a locked state in which the memory shoe is locked relative to the fixed rail, or in an unlocked state in which the memory shoe is free to slide along the fixed rail forward from the memorized position and backward as far as the memorized position;

coupling means for coupling the moving rail to the memory shoe, said coupling means being in a coupled state at least when the first and second locking means are both in the unlocked state, the moving rail and the memory shoe then being secured to each other, and said coupling means being in an uncoupled state at least when the first locking means are in the unlocked state while the second locking means are in the locked state, the moving rail and the memory shoe then being no longer secured to each other;

first control means for placing the first and second locking means simultaneously in the unlocked state; and second control means for placing the first locking means only in the unlocked state, the second locking means then remaining in the locked state;

wherein the memory shoe further includes a fixing member for fixing a safety belt at a position behind the moving rail.

2. A slide according to claim 1, wherein:

the fixed rail includes a set of teeth;

the first locking means include a first lock which is mounted on the moving rail and which co-operates with the set of teeth to lock the moving rail; and the second locking means include a second lock which is mounted on the memory shoe and which co-operates with the set of teeth to lock the memory shoe.

3. A slide according to claim 1, wherein:

the first locking means include a first lock mounted on the moving rail and co-operating with the fixed rail to lock said moving rail, said first lock being displaceable between a locked position and an unlocked position which corresponds respectively to the locked state and the unlocked state of the first locking means, and said first lock is biased towards the locked position by a first spring;

the second locking means include a second lock which is mounted on the memory shoe and which co-operates with the fixed rail to lock said memory shoe, said second lock being displaceable between a locked position and an unlocked position corresponding respectively to a locked state and to an unlocked state of the second locking means, and said second lock is biased by a second spring towards the locked position;

a pawl is mounted on the moving rail, said pawl being displaceable between an engaged position in which said pawl holds the first lock in the unlocked position, and a retracted position in which said pawl does not interfere with the first lock, said pawl being biased towards said engaged position by a third spring; and an abutment member is secured to the memory shoe, said abutment member being designed to displace and hold the pawl in said retracted position while the moving rail is in said memorized position.

4. A slide according to claim 3, wherein:

the first control means include a control shaft which extends longitudinally parallel to the fixed rail and to the moving rail, and which is mounted to rotate between a rest position and an actuation position, the control shaft being urged towards said rest position by a fourth spring;

the first lock is mounted to rotate with lost motion about the control shaft, first and second angular clearances being provided in two respective opposite angular directions between the control shaft and the first lock when the control shaft is in said rest position and the first lock is in the locked position, the first angular clearance allowing the first lock to move from the locked position to the unlocked position under the action of second control means without entraining rotation of the control shaft, the second angular clearance being provided so that rotation of the control shaft from said rest position to said actuation position takes place initially without rotating the first lock until said second angular clearance has been taken up, after which the control shaft entrains the first lock to the unlocked position;

the second lock is mounted to rotate about an axis disposed in line with the control shaft; and the control shaft includes a coupling end that comes into engagement with a receiver portion secured to the second lock when the moving rail is in said memorized position, the control shaft then entraining the second lock in rotation from the locked position to the unlocked position with third angular clearance when said control shaft is displaced from said rest position to said actuation position, a bayonet coupling being provided between the actuation end of the control shaft and the receiver portion to secure the moving rail to the memory shoe after taking up the third clearance, said coupling end and said receiver end thus constituting the abovementioned coupling means.

5. A slide according to claim 3, wherein the second control means include a crank secured to the second lock.

6. A slide according to claim 1, wherein:

the first locking means include a first lock which is mounted on the moving rail and which is biased into a rest position by a first spring;

the second locking means are constituted by a second lock which is mounted on the memory shoe and which is displaceable between a locked position in which said second lock cooperates with the fixed rail to lock the memory shoe, and an unlocked position in which said second lock enables the memory shoe to slide, said second lock being biased towards the locked position by a second spring;

the first lock engages the second lock when said first lock is in said rest position and said second lock is in the locked position so long as the moving rail is in said memorized position, for the purpose of locking the moving rail to the memory shoe which is itself locked relative to the fixed rail, the first and second locking means thus being in the locked state;

the first lock is displaceable in a first direction under the action of said first control means, the first lock then remaining engaged with the second lock and acting on said second lock to displace it into the unlocked position, the first and second locking means then being in the unlocked state and the first lock constituting the coupling means between the moving rail and the memory shoe; and the first lock is also displaceable in a second direction opposite to the first direction under action from the second control means, thereby releasing the first lock, the first locking means thus being in the unlocked state while the second locking means remain in the locked state.

7. A slide according to claim 6, wherein the first and second locks include respective portions which co-operate by cam action to displace the first lock in the second above-mentioned direction when the moving rail is returned towards said memorized position after having been moved away therefrom, the first lock subsequently be returned to said rest position once the moving rail has returned to said memorized position, thereby locking the moving rail, the second spring having sufficient force to hold the second lock in the locked position during this movement.

8. A vehicle seat comprising:

a seat proper; and a slide to which said seat proper is longitudinally mounted to slide therealong, said slide including:

comprising a fixed rail designed to be secured to the vehicle, a moving rail designed to support the seat proper of the seat, said moving rail being disposed parallel to the fixed rail and being mounted to slide along said fixed rail, first locking means for locking the moving rail relative to the fixed rail, said first locking means being capable of being placed either in a locked state in which the moving rail is locked relative to the fixed rail, or in an unlocked state in which the moving rail is free to slide forward and backward along the fixed rail, a memory shoe displaceable in translation along the fixed rail and limiting movement of the moving rail backward in the longitudinal direction of the fixed rail, thereby defining a memorized position of the moving rail, the memory shoe including a length of rail having the same section as the moving rail, wherein said length is slidably mounted to slide along the fixed rail in the same manner as said moving rail, second locking means for locking the memory shoe relative to the fixed rail, said second locking means being capable of being placed either in a locked state in which the memory shoe is locked relative to the fixed rail, or in an unlocked state in which the memory shoe is free to slide along the fixed rail forward from the memorized position and backward as far as the memorized position, coupling means for coupling the moving rail to the memory shoe, said coupling means being in a coupled state at least when the first and second locking means are both in the unlocked state, the moving rail and the memory shoe then being secured to each other, and said coupling means being in an uncoupled state at least when the first locking means are in the unlocked state while the second locking means are in the locked state, the moving rail and the memory shoe then being no longer secured to each other, first control means for placing the first and second locking means simultaneously in the unlocked state, and second control means for placing the first locking means only in the unlocked state, the second locking means then remaining in the locked state, wherein the memory shoe further includes a fixing member for fixing a safety belt at a position behind the moving rail; and wherein the seat proper is fixed to the moving rail of the slide, said seat including a safety belt having a plurality of fixing points, one of which is constituted by the fixing member belonging to the memory shoe.

9. A vehicle seat according to claim 8, wherein the fixing member belonging to the memory shoe is the only fixing point of the belt which is fixed to the seat.

* * * * *